United States Patent [19]
Van Nieuwland et al.

[11] Patent Number: 5,163,032
[45] Date of Patent: Nov. 10, 1992

[54] MAGNETO-OPTICAL RECORDER WITH SERVO CONTROL SYSTEM FOR A MAGNETIC-FIELD MODULATION SYSTEM

[75] Inventors: Jacob M. Van Nieuwland, Eindhoven; Heemskerk: Jacobus P. J., Veldhoven; Johannes L. Bakx, Eindhoven; Jan J. Janse, Nuenen, all of Netherlands

[73] Assignee: U.S. Philips Corp., New York, N.Y.

[21] Appl. No.: 717,871

[22] Filed: Jun. 12, 1991

Related U.S. Application Data

[63] Continuation of Ser. No. 277,626, Nov. 29, 1988, abandoned.

[30] Foreign Application Priority Data

Jun. 7, 1988 [FR] France .................. 88 07544

[51] Int. Cl.$^5$ .................. G11B 11/14; G11B 13/04
[52] U.S. Cl. .................. 369/013; 360/59; 360/114
[58] Field of Search .................. 369/13, 14; 360/59, 360/66, 114; 365/122

[56] References Cited

U.S. PATENT DOCUMENTS

| | | | |
|---|---|---|---|
| 4,357,696 | 5/1982 | Bierhoff | 369/45 |
| 4,550,346 | 10/1985 | Hatano | 358/330 |
| 4,670,865 | 6/1987 | Hatano | 369/13 |
| 4,706,232 | 11/1987 | Funada et al. | 360/59 |

FOREIGN PATENT DOCUMENTS

| | | | |
|---|---|---|---|
| 57-133503 | 8/1982 | Japan | 369/13 |
| 60-00630 | 1/1985 | Japan | 369/13 |
| 60-209944 | 10/1985 | Japan | 369/13 |
| 63-177304 | 7/1988 | Japan | 369/13 |
| 2119558 | 11/1983 | United Kingdom . | |
| 2119999 | 11/1983 | United Kingdom . | |

OTHER PUBLICATIONS

Philips Technical Review, vol. 42, No. 2, Aug. 1985, pp. 37-47.

Primary Examiner—Hoa Nguyen
Attorney, Agent, or Firm—William L. Botjer

[57] ABSTRACT

The invention relates to a magneto-optical recorder with magnetic-field modulation. It comprises a laser (8) for producing a light beam (6), an optical focussing system (9) for forming a focal spot (12), and a servo device (10) for maintaining the focal spot (12) in focus on the surface of a thermo-magnetic record carrier (4), and for supplying a correction signal ($V_c$) which is representative of the position of the surface of said carrier. A current modulator modulates the current through a coil (15) of a magnetic head. A compensation device (7) is responsive to said correction signal ($V_c$) to change a parameter influencing the field of the coil, in such a way that the field strength at the surface of said carrier (4) is substantially independant of the position of said surface.

3 Claims, 2 Drawing Sheets

MAGNETO-OPTICAL RECORDER WITH SERVO CONTROL SYSTEM FOR A MAGNETIC-FIELD MODULATION SYSTEM

This is a continuation of application Ser. No. 277,626, filed Nov. 29, 1988 now abandoned.

BACKGROUND OF THE INVENTION

The invention relates to a magneto-optical recorder comprising an optical system for directing a radiation beam towards a thermo-magnetic layer of a magneto-optical record carrier, which optical system comprises a focussing device for focussing the radiation beam so as to form a focal spot on the thermo-magnetic layer, and a servo system for keeping the focal spot in focus on said layer, which servo system is constructed to produce a correction signal which is representative of the position of the thermo-magnetic layer relative to the optical system, and a current modulator for modulating the current through a coil of a magnetic recording head.

Such a recorder is known from the article "Erasable magneto-optical recording" by M. Hartmann et al. in Philips Technical Review, Vol. 42, No. 2, August 1985, pp. 37–43.

In view of the heat dissipation in the coil and the power consumption of the recorder it is desirable that the current through the coil during a write operation is the minimum current permissible for a reliable recording on the carrier. Technical progress has led to the use of large-diameter discs with plastics substrates which are not perfectly flat and which exhibit an excursion of approximately ±0.5 mm parallel to their axis.

As a result of this the strength of the magnetic field at the disc surface varies from point to point depending on the axial excursion of said disc.

The currently available thermo-magnetic materials require a magnetic field of approximately 200 to 300 Oe for the purpose of recording. For a reliable recording process larger than normal currents have to be used in order to ensure that the field strength is always adequate at any point, taking into account the disc excursion. This solution also has the aforementioned drawback that the heat dissipation in the coil and the power consumption of the recorder increase, resulting in excessive field strengths at certain points of the disc, which gives rise to write noise and a consequent deterioration of the signal-to-noise ratio.

It is the object of the invention to mitigate these drawbacks.

SUMMARY OF THE INVENTION

To this end a magneto-optical recorder of the type defined in the opening paragraph is characterized in that comprises a compensation device for changing, in response to the correction signal, a parameter influencing the field produced by the coil in such a way that the field-strength in the thermo-magnetic layer is substantially independent of the position of said layer.

In a first embodiment said parameter is the position of the coil, and the compensation device is a first translation device for moving the coil parallel to its axis, in such a way that it follows the displacement of the focal spot.

In a first variant of said embodiment the servo system comprises a second translation device for axially moving the focussing device, the focussing device and the coil are arranged at opposite sides of the carrier, the first and the second translation device are arranged opposite one another, and servo system is adapted to apply the correction signal to the respective inputs of said translation devices.

In a very advantageous embodiment the first and the second translation device are of the magnetic type and of the same construction and are coupled to the servo system in such a way that they are driven in phase opposition to each another.

In a preferred embodiment said parameter which influences the field of the coil is the current through said coil and the compensation device is a control system which is constructed to operate in accordance with a predetermined function of the current through the coil.

This ensures that the coil always delivers only the necessary current.

Said predetermined function may be a linear approximation of the characteristic in accordance with which the field varies along the coil axis as a function of the distance.

Said control device may be a pulse width modulator having a main input arranged to receive the voltage from a direct voltage source, having a modulation input arranged to receive the correction signal and having an output connected to a power supply input of the current modulator. In this way the amplitude of the pulses applied by the current modulator can be adjusted very simply and the heat dissipation in the power supply is minimized. Suitably, the input of the pulse-width modulator comprises a low-pass filter whose cut-off frequency is selected so as to reject correction-signal components which are not representative of the excursion of a disc.

BRIEF DESCRIPTION OF THE DRAWING

Embodiments of the invention will now be described in more detail, by way of non-limitative example, with reference to the accompanying drawings, in which.

DETAILED DESCRIPTION OF THE PREFERRED EMBODIMENTS

Figure 1:
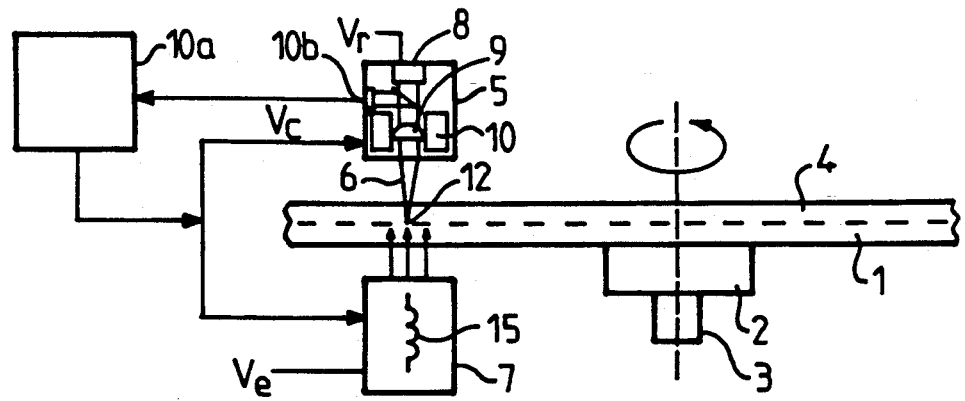
FIG. 1 shows a magneto-optical recorder in accordance with the invention.

In FIG. 1 a disc 1 having a thermo-magnetic layer 4, for example as described in Philips Technical Review, Vol. 42, No. 2, pp. 37–47, is disposed on a turntable 2 driven by a motor 3. An optical head 5 comprises a laser 8 emitting a beam 6 which passes through a focussing device 9 to focus the beam 6 on the layer 4.

The focal spot is maintained in focus on the layer by means of a focus servo-loop of a known type, for example as described in the Applicants's European Patent Application No. 21510 filed on Jun. 15, 1980 which corresponds to U.S. Pat. No. 4,357,696. Said loop may comprise a focus-error detector 10b, a control device 10a, and a translation device 10. The focus-error detector 10b supplies a signal representing the focus error. The intensity of the laser beam 8 is modulated in response to a signal Vr. During a write operation the signal Vr is such that the power of the laser beam can locally heat the layer 4 to a recording temperature. A recording device 7, comprising a power supply circuit and a recording head with a coil 15, is driven by a write signal $V_e$. The current through the coil 15 may have either of two values corresponding to two opposite field values at the location of the layer 4 in the proximity of the focal spot 12.

If the disc 1 is not perfectly flat the distance between the layer 4 and the coil 15 will vary periodically during rotation of the disc, in conformity with the warping profile of the disc. It follows that the thermo-magnetic layer 4 does not see a constant field as it moves past the coil 15.

In order to allow for this effect, it is possible to increase the current through the coil 15 in such a way that the field is always adequate to ensure a correct recording in the layer 4. However, the heat dissipation in the coil and the electric power consumption of the circuit energizing the magnetic head then increase and, moreover, the field strength may locally exceed the desired value, as a result of which the signal-to-noise ratio may deteriorate.

For these reasons it is desirable to provide a compensation which allows for the actual field strength at the location of the layer 4.

According to the invention use is made of the correction signal $V_c$, which is representative of the position of the surface of the layer 4 and which is already available, to influence a parameter influencing the field produced by the coil 15 in the layer 4.

Figure 2:
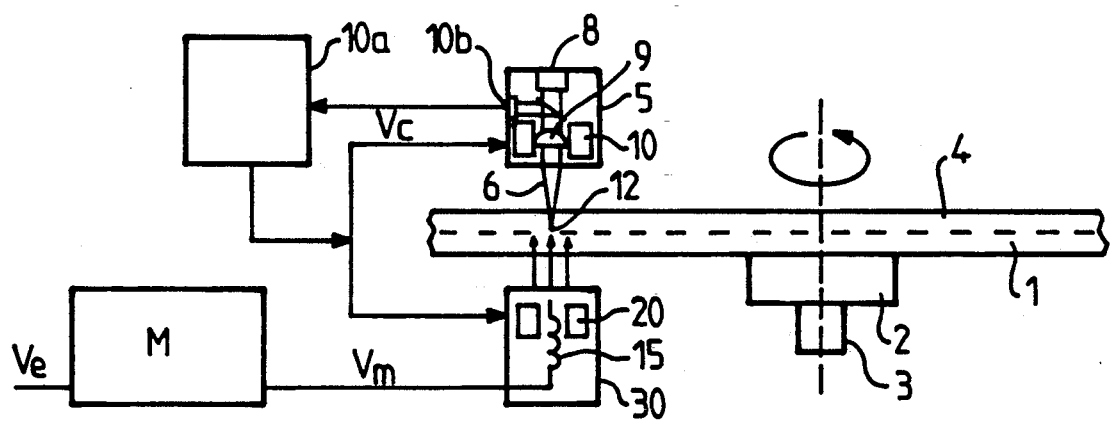
FIGS. 2 and 3 show a first and a second variant of a magneto-optical recorder in accordance with the invention.

In FIG. 2 said parameter is the position of the coil. The correction signal $V_c$ is applied to the input of a translation device 20 which is constructed to move the coil 15 parallel to its axis in such a way that it follows the displacements of the focal spot 12, i.e. those of the focussing device 9, which receives a parallel light beam. This translation device 20 is suitably of the same type as the electro-magnetic device which provides the displacement of the focussing device 9. In the situation as illustrated, in which the laser 8 and the focussing device 9 are arranged at one side and the coil 15 is arranged at the other side of the disc 1, the two translation devices, which are both of the same magnetic type are suitably driven in phase opposition and, because they are arranged symmetrically relative to the average position of the disc surface, their leakage fields at least largely cancel each other at the location of the layer 4.

The power-supply circuit is a current modulator M whose input receives the write signal $V_e$ to produce an output signal Vm constituting the drive current for the coil 15 of the magnetic head 30.

Figure 3:
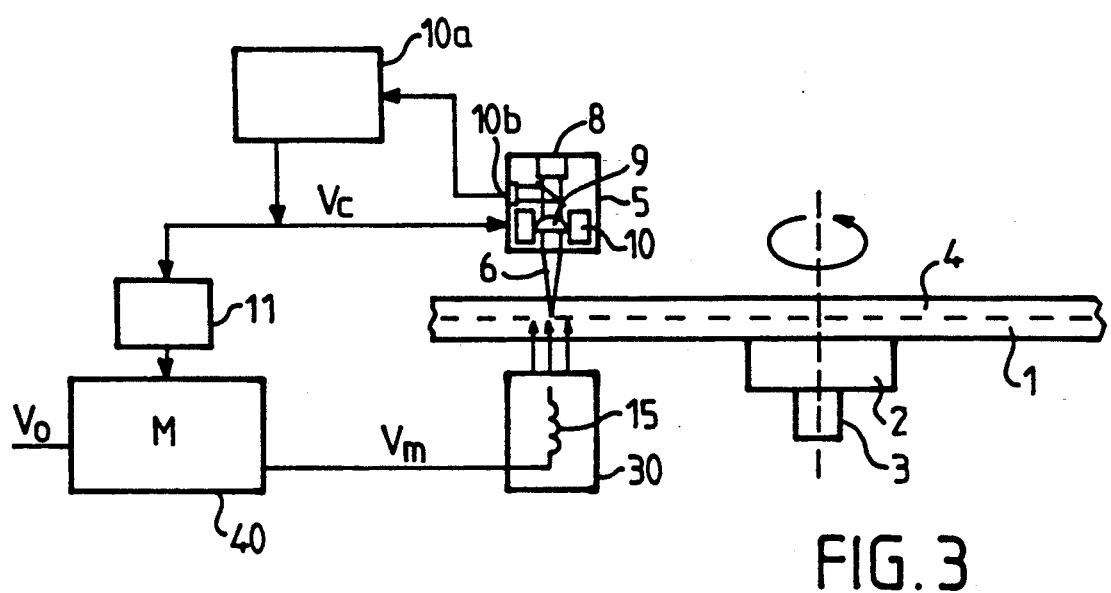

As is shown in FIG. 3, the said parameter is the current through the coil 15 and the correction signal Vc is used for varying the amplitude of the current through the coil 15.

The correction signal Vc is applied to the input of a modulation circuit 11 whose output is applied to another input of the current modulator M in order to change the amplitude of the signal Vm as a function of the variation of the correction signal Vc.

Figure 4:
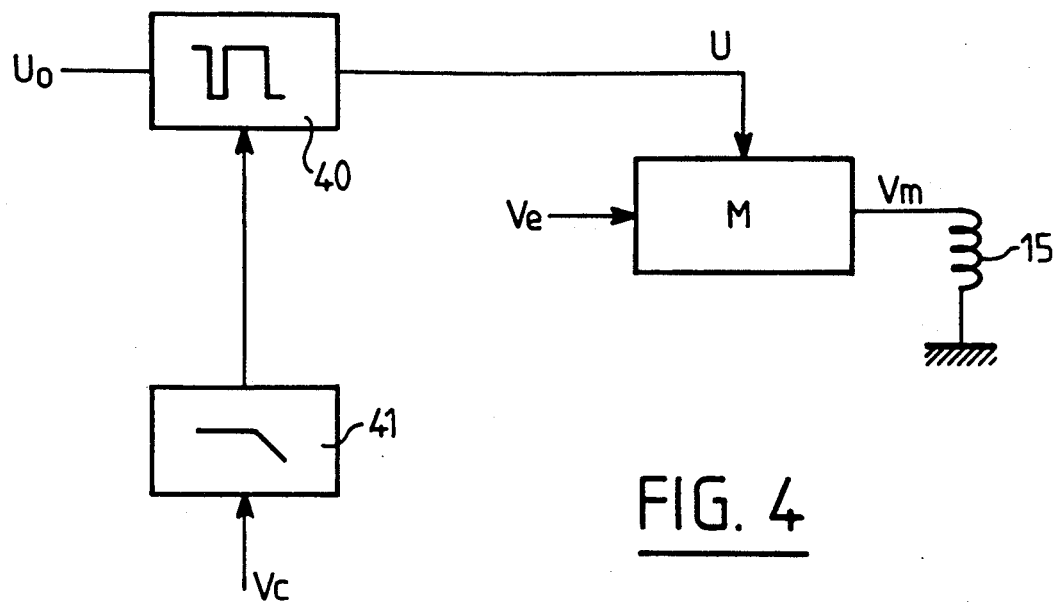
FIG. 4 shows a circuit for implementing the second variant of the invention.

In FIG. 4 the correction signal Vc, which may be filtered by a low-pass filter 41 in order to remove components which are not representative of the disc excursion, is applied to the modulation input of a pulse-width modulator 40, which is biassed with a supply voltage $V_o$.

The output voltage u of the pulse-width modulator 40 is applied to the power-supply input of the current modulator M. Thus, the output signal $V_m$, which produces the current through the coil 15, has an amplitude which varies as a function of the correction voltage $V_c$ with a slope which depends on the gain of the pulse-width modulator 40 and which in a first approximation is selected to correspond to the slope with which the field varies along the axis of the coil as a function of the distance.

Figure 5:
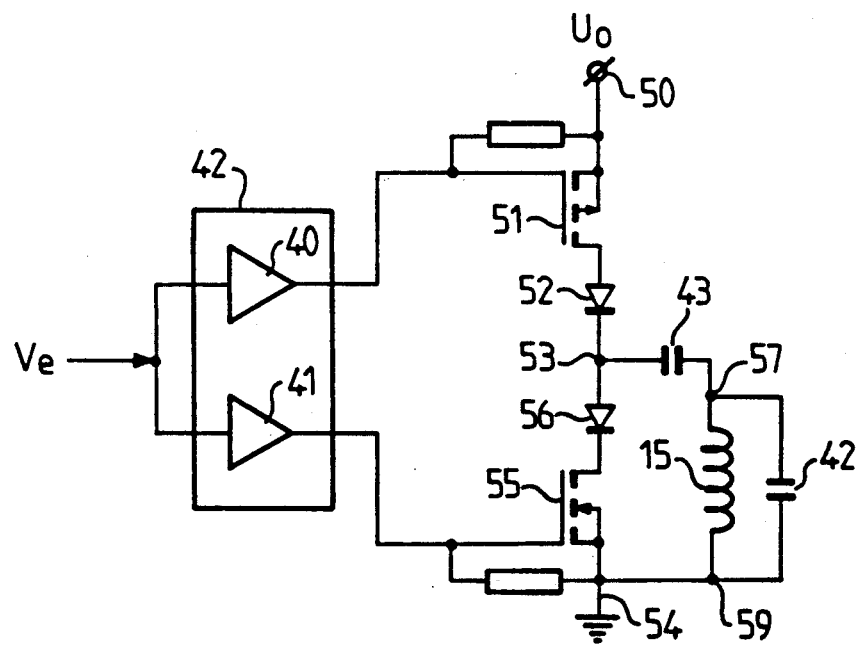
FIG. 5 shows a current modulator for use in an embodiment of the invention.

By means of the current modulator described with reference to FIG. 5 it is possible to obtain a variation corresponding to fields of approximately 200–300 Oe in both directions at a low supply voltage (of the order of 5 to 15 V) and without the use of series resistors. To achieve this the coil 15 is arranged in a parallel resonant circuit, and after the coil has been uncoupled from one of the potential points, switching means inhibit coupling to any other potential for a time interval corresponding to substantially half the resonance period of the resonant circuit. The arrangement shown in FIG. 5 is constructed in particular, but not exclusively, for coded signals which do not exhibit a d.c. component, i.e. the average time during which the signal has the logic value 1 is equal to that during which it has the logic value 0. The current in the coil is then the same in both directions, which corresponds to magnetic fields of equal absolute value, which is a favourable situation for magneto-optical recording. Moreover, this arrangement requires only one power-supply source.

The current modulator M comprises a switch 51 constituted by a P-type field-effect transistor (for example BST100) and a switch 55 constituted by an N-type field-effect transistor (for example BST70A). A control circuit 42 comprises two intermediate amplifiers 40 and 41 which suitably form part of the same integrated circuit, for example 74HC125. The coil 15 is arranged in parallel with a capacitor 42 to form the parallel resonant circuit. If a d.c. component should be present, a capacitor 43 is arranged in series with the coil 15 between the terminal 54 and a junction point 43 to form a high-pass filter in combination with the resonant circuit. A diode 52 poled in the forward direction is arranged in series with the switch 51 and the junction point 53. A diode 56 poled in the forward direction is arranged in series between the junction point 53 and the switch 55.

The switches 51 and 55 are respectively connected to a power supply source $U_o$ (or U in the embodiment shown in FIG. 4) and to the common-mode terminal.

The value of the capacitor 42 is selected in such a way that the period of the resonant circuit is smaller than the maximum switching time needed for reversal of the magnetic field (for example 50 ns).

In the present example the capacitance value should be smaller than 50 pF for a coil 15 having an inductance of 7 $\mu$H.

When the state of the signal Ve changes the coil 15 is disconnected at one of its ends. This produces a transient in the resonant circuit, which inhibits coupling to the other end as long as the corresponding diode 52 or 56 remains cut-off by the voltage transient thus produced.

What is claimed is:

1. A magneto-optical recorder comprising an optical system for directing a radiation beam toward a thermo-magnetic layer of a magneto-optical record carrier, which optical system comprises a focussing device for focussing the radiation beam so as to form a focal spot on the thermo-magnetic layer, and a servo system for keeping the focal spot in focus on said layer, which servo system is constructed to produce a correction signal which is representative of the position of the thermo-magnetic layer relative to the optical system, and a current modulator for modulating the current through a coil of a recording head, characterized in that the current modulator includes control means for altering the current through the coil in such a way that the field strength produced by the coil in the thermomagnetic layer is substantially independent of the positon of said layer with respect to said recording head, said control means including a pulse width modulator having a main input arranged to receive the voltage from a direct voltage source having a modulation input arranged to receive the correction signal and having an output connected to a power supply input of the current modulator.

2. A recorder as claimed in claim 1, characterized in that the pulse-width modulator includes a low-pass filter for filtering the correction signal and having a cut-off frequency which is selected so as to reject correction-signal components which are not representative of the excursion of the record carrier.

3. A recorder as claimed in claim 1, characterized in that the current modulator comprises an inut for receiving a binary control signal, a switching device for bringing at least one input of the coil alternately at a first and at a second potential as a function of the logic state of said binary control signal, in that the coil is arranged in a parallel resonant circuit, and in that the switching device comprises a device for inhibiting, after said input of the coil has been uncoupled from either the first or the second potential, coupling of said input to the other potential for a time interval corresponding to substantially half the resonance period of the resonant circuit.

* * * * *